United States Patent Office 3,284,501
Patented Nov. 8, 1966

---

3,284,501
α-HYDROXY OXIMES
Ronald R. Swanson, New Hope, Minn., assignor to General Mills, Inc., a corporation of Delaware
No Drawing. Filed July 2, 1965, Ser. No. 469,336
3 Claims. (Cl. 260—566)

This application is a continuation-in-part of my prior application Serial No. 260,868, filed February 25, 1963, and now abandoned.

The present invention relates to new α-hydroxy oximes. More particularly, it relates to new α-hydroxy oximes having the structural formula:

$$\begin{array}{c} \text{OH} \quad \text{NOH} \\ | \quad\quad || \\ \text{R}-\text{C}-\text{C}-\text{R}' \\ | \\ \text{H} \end{array}$$

where R and R' are branched chain alkyl groups containing from about 6 to 20 carbon atoms, said groups being attached to the carbons substituted with the —OH and =NOH groups through a secondary carbon atom. The α-hydroxy oximes of this invention also contain a total of from about 14 to 40 carbon atoms. Representative mono- and polyalkyl substituted saturated radicals are as follows:

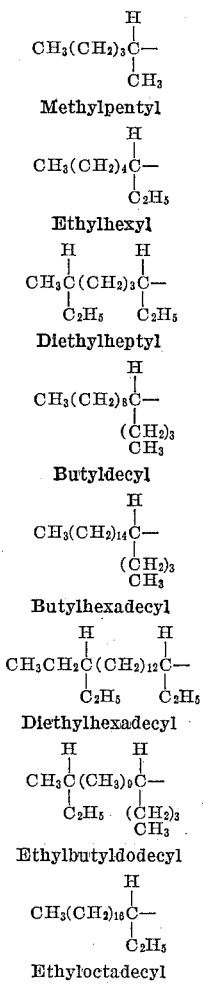

and the like. It is also preferred that R and R' are the same.

My new compounds are prepared by reacting an acyloin with a hydroxylamine salt under reflux conditions. Such reaction can be carried out by refluxing the reactants in an alcohol such as ethanol and adding pyridine to combine with the acid associated with the hydroxylamine. It is also preferred to use an excess of the hydroxylamine salt which salt may be the hydrochloride, acid sulfate or the like.

The following examples serve to illustrate the present invention without, however, limiting the same thereto.

*Example I*

Into a 1 liter reaction flask equipped with a reflux condenser were charged 106.6 g. (0.4 mole) 5,8-diethyl-7-hydroxydodecan-6-one, 55.6 g. (0.8 mole) hydroxylamine hydrochloride, 250 ml. pyridine and 250 ml. absolute ethanol. The reaction mixture was heated to reflux and held for 3 hours. The crude reaction mixture, after cooling overnight, was added to 1 liter of water along with 500 ml. ether. The aqueous layer was discarded and then the ether layer was washed 4 times with water, 2 times with 3% HCl solution and 4 more times with water. The ether layer was dried and stripped of ether under vacuum to leave a quantitative yield of water white product which was 5,8-diethyl-7-hydroxydodecan-6-oxime. The structural formula of the compound is

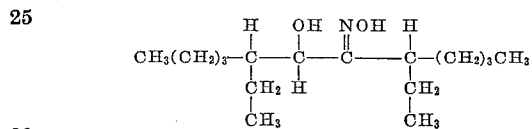

The new compounds of the present invention are extremely valuable as extractants for recovering copper values from aqueous solutions. Thus about 2 to about 50% by weight of the α-hydroxy oximes can be dissolved in a liquid hydrocarbon which is then contacted with an aqueous solution containing copper values. The copper values are extracted into the water immiscible organic phase. Copper metal can be recovered directly by hydrogenating the organic phase. Copper metal can also be recovered by contacting the separated copper-pregnant organic phase with an aqueous stripping medium which preferably contains a mineral acid such as sulfuric acid. The copper values are thus stripped from the organic phase and copper metal can be recovered from the copper-pregnant aqueous stripping medium by direct electrolysis. Copper salts can also be recovered from the stripping medium by crystallization and/or evaporation. This extraction process utilizing the new compounds of the present invention makes it commercially feasible and economical to recover copper from dilute aqueous solutions or solutions which contain other metal contaminants. And, of course, copper metal is very valuable.

The compounds of my invention have an unexpected combination of properties which make them highly superior as extractants for copper values. In this respect, they: (1) are soluble in the common and cheap hydrocarbon solvents such as kerosene; (2) can be used to extract copper values from aqueous solutions having widely varying pH's; and (3) are relatively stable to hydrolysis and thus the organic phase can be repeatedly recycled after being stripped for extracting copper values from further quantities of aqueous solutions containing same. In contrast, straight chain alkyl α-hydroxy oximes of equal carbon atom content are not soluble in the commercially feasible solvents such as kerosene and were found to have only limited solubility in a special aromatic naphtha solvent. When dissolved in said latter solvent, such a straight chained compound was found to give no perceptible extraction of copper values from an ammoniacal aqueous solution. When the straight chained compounds are dissolved in chloroform, it was found that copper values were extracted from acidic aqueous solutions. However, chloroform is expensive, fairly toxic, volatile and has a water solubility of about 1%. Thus such a system has limited commercial utility. For these reasons, the straight chained alkyl α-hydroxy oximes are not economically practical for extracting copper values from aqueous solutions thereof. The compounds of the present invention also have unexpected hydrolytic stability. In contrast, branched chain alkyl α-hydroxy oximes wherein the alkyl radicals are not attached to the carbon atoms substituted with the —OH and =NOH groups through secondary carbon atoms do not have the requisite hydrolytic stability to be of much commercial utility. In this respect, they extract copper values from aqueous solutions but are not capable of being repeatedly stripped and recycled for further extractions. Thus they hydrolyze and become of little or no value in a short time in the extraction process.

The following examples illustrate the unexpected properties and high utility of the compounds of my invention.

*Example II*

Ten milliliter portions of an aqueous feed solution containing copper values (0.033 M $CuSO_4$ and 0.5 M $Na_2SO_4$) were extracted with 20 milliliter portions of 0.1 molar solutions of the α-hydroxy oxime of Example I in kerosene. Varying amounts of $NaHSO_4$ and $NaHCO_3$ and $Na_2CO_3$ solutions were added to the different separatory funnels containing the aqueuos feed solutions for pH control. In each case, however, the total aqueous phase volume was 15 milliliters after such additions. The extractions were performed on a single stage batch basis at ambient room temperature. The organic solvent was first added to the funnels followed by addition of the aqueous feed solution and then the $NaHSO_4$, $NaHCO_3$ or $Na_2CO_3$ solutions. The funnels were shaken to equilibrate the mixtures and then the phases were allowed to separate. The aqueous phase was analyzed for residual copper and the pH thereof was also measured. The results are set forth in the following table.

TABLE

| Extraction No. | pH | [$Cu^{++}$] Aq. (moles/l.) | [$Cu^{++}$] Org. (moles/l.) | Percent $Cu^{++}$ Extracted |
| --- | --- | --- | --- | --- |
| 1 | 2.63 | 0.032 | 0.0007 | 3 |
| 2 | 2.78 | 0.029 | 0.00305 | 12.1 |
| 3 | 2.88 | 0.026 | 0.00525 | 21.2 |
| 4 | 2.96 | 0.022 | 0.00825 | 33.3 |
| 5 | 3.06 | 0.015 | 0.0131 | 53 |
| 6 | 3.21 | 0.0105 | 0.0173 | 70 |
| 7 | 3.39 | 0.005 | 0.021 | 80 |
| 8 | 4.59 | 2 p.p.m. | 0.0245 | 100 |

*Example III*

An aqueous solution was prepared by placing 78.6 g. of $CuSO_4 \cdot 5H_2O$, 69 g. of aqueuos $NH_4OH$ (29% $NH_3$ by weight), and 40 g. of $(NH_4)_2CO_3$ in a large vessel and adding a sufficient amount of distilled water thereto to make a total solution volume of 2 liters. A ten milliliter portion of this solution which analyzed 0.15 M $Cu^{++}$ was then placed in a 125 milliliter separatory funnel. To this solution was added ten milliliters of a 5% by weight solution of the α-hydroxy oxime of Example I in Panasol AN-1. The two solutions were shaken together at ambient room temperature in the separatory funnel for two minutes and then the phases were allowed to separate. The resulting separated aqueous phase analyzed 0.012 M $Cu^{++}$ thus indicating that 5,8-diethyl-7-hydroxy-dodecane -6-oxime is an excellent copper extractant, over 90% of the copper values being extracted from the aqueous solution. The compound is also soluble in kerosene and no heat was needed to dissolve same in the Panasol AN-1 solvent. When dissolved in kerosene, equally good extractions of copper values from their aqueous solutions are obtained.

*Example IV*

A ten milliliter portion of the starting aqueous solution described in Example III was added to a 125 milliliter separatory funnel and Example III was repeated except that 9-hydroxyhexadecan-8-oxime was used instead of 5,8-diethyl-7-hydroxy-dodecan-6-oxime. In order to obtain complete solution of the 9-hydroxyhexadecan-8-oxime, the Panasol AN-1 had to be heated to a slightly elevated temperature. The said oxime was substantially completely insoluble in kerosene. The oxime had the general structural formula $$CH_3(CH_2)_5-\overset{\overset{OH}{|}}{\underset{\underset{H}{|}}{C}}-\overset{\overset{NOH}{\|}}{C}-(CH_2)_6CH_3$$

The resulting separated aqueous phase analyzed 0.15 M $Cu^{++}$ thus indicating that the 9-hydroxyhexadecan-8-oxime when dissolved in the special aromatic naphtha solvent failed to extract any perceptible amount of the copper values from the ammonial aqueous solution. The solvent, Panasol AN-1, used in Examples III and IV is an aromatic naphtha solvent and has the following specifications:

| | |
| --- | --- |
| Gravity, ° API, max., 60° F. | 18.5. |
| Distillation, ° F.— | |
| Percent off: | |
| IBP, Min. | 370 (188° C.). |
| EP, Max. | 510 (266° C.). |
| Color, Saybolt, min. | 10. |
| Aromatics, vol. percent, min. | 90. |
| Mixed aniline, pt., ° F., max. | 71 (22° C.). |
| Flash point, COC, ° F., min. | 165 (74° C°). |
| Appearance | Clear, no free suspended matter. |

*Example V*

To a 1 liter flask equipped with a stirrer and thermometer and set in a constant temperature bath was added 400 milliliters of a 5% solution of the α-hydroxy oxime of Example I in kerosene. There was then added an aqueous solution which simulates a copper-pregnant strip solution—i.e. a solution which after contact with a loaded organic phase contains the copper values stripped from the loaded organic phase. This solution was composed of 400 milliliters of a 1 M $CuSO_4$ aqueous solution and 75 grams of concentrated $H_2SO_4$. This mixture was held at 55° C. and 20 milliliter samples of the organic phase containing the α-hydroxy oxime were removed periodically. These samples were then contacted with 15 milliliter portions of an aqueous solution which contained 10 grams/liter of $Cu^{++}$ (from $CuSO_4$), 10 grams/liter ammonia, and 20 grams/liter $(NH_4)_2CO_3$. At the end of one day the sample of α-hydroxy oxime in kerosene extracted copper values from the aqueous solution at substantially 100% of its potential. Results at the remaining intervals were as follows: two days—93+%; one week—91+%, two weeks—88+%; four weeks—73+%; six weeks—60+%; and eight weeks—44+%. This data clearly indicates that the α-hydroxy oximes of the present invention are very stable to hydrolysis and thus when dissolved in a hyrocarbon solvent can be repeatedly recycled for extraction of further quantities of copper values from aqueous solutions thereof.

*Example VI*

Example V was repeated except that the temperature of the constant temperature bath was held at 45° C. and the samples of the organic phase containing the α-hydroxy oxime of Example I were diluted with an equal quantity of kerosene after separation from the simulated copper-pregnant stripping medium. Results were as follows: one day—100%; three days—90+%; one week—90+%; two weeks—84+%; four weeks—84+%; six weeks—75+%; and eight weeks—72+%. The data of this example also show the excellent hydrolytic stability of the α-hydroxy oximes of the present invention.

*Examples VII and VIII*

Example VI was repeated except that the temperature of the constant temperature bath was held at 55° C. and branched chain alkyl α-hydroxy oximes wherein the alkyl radicals are not attached to the carbon atoms substituted with the —OH and =NOH groups through secondary carbon atoms were used in place of the α-hydroxy oxime of Example I. The oxime used in Example VII had the general structural formula

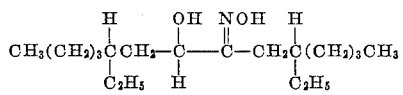

The oxime used in Example VIII had the general structural formula

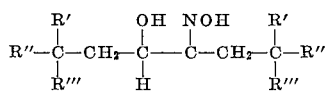

where the sum of the carbon atoms in R′, R″ and R‴ is 7. This latter oxime was prepared from the acyloin derived from the mixture of branched chain decanoic acids obtained in the oxo process. Results were as follows: Examples VII—one day—84%; three days—48%; one week—24%; two weeks—16%; four weeks—16%; six weeks—8%; and eight weeks—8%; Example VIII—one day—64+%; three days—48+%; one week—38+%; two weeks—29+%; four weeks—29+%; six weeks —24+%; and eight weeks—20+%.

The data of Examples V–VIII show that the compounds of the present invention have unexpectedly superior hydrolytic stability to similar compounds which do not have the branched chain alkyl radical attached to the carbons substituted with the —OH and =NOH groups through secondary carbon atoms. The compounds of the present invention are eminently useful for extraction of copper values from their aqueous solutions due to their excellent solubility in cheap hydrocarbon solvents, their excellent hydrolytic stability and their ability to extract copper values from solutions which have highly varying pH's.

It is to be understood that the invention is not to be limited to the exact details of operation or the exact compositions shown and described, as obvious modifications and equivalents will be apparent to those skilled in the art and the invention is to be limited only by the scope of the appended claims.

I claim:

1. α-Hydroxy oximes having the formula

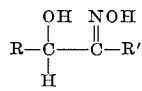

where R and R′ are branched chain alkyl groups containing 6 to 20 carbon atoms attached to the carbons substituted with the —OH and =NOH groups through secondary carbon atoms, said oximes being further characterized as having a total carbon atom content of 14 to about 40.

2. α-Hydroxy oximes as defined in claim 1 wherein R and R′ are the same.

3. 5,8-diethyl-7-hydroxydodecan-6-oxime.

References Cited by the Examiner

Feigl et al., "Berichte," volume 58, pages 2294–2303 (1925).

CHARLES B. PARKER, *Primary Examiner.*

ROBERT V. HINES, *Assistant Examiner.*

UNITED STATES PATENT OFFICE
CERTIFICATE OF CORRECTION

Patent No. 3,284,501    November 8, 1966

Ronald R. Swanson

It is hereby certified that error appears in the above numbered patent requiring correction and that the said Letters Patent should read as corrected below.

Column 1, lines 36 to 39, the formula should appear as shown below instead of as in the patent:

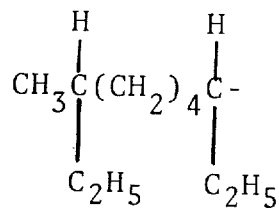

lines 57 to 61, the formula should appear as shown below instead of as in the patent:

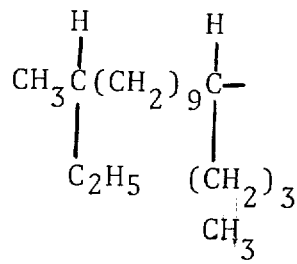

column 4, line 21, for "ammonial" read -- ammonical --; column 5, line 31, for "64+%" read -- 66+% --.

Signed and sealed this 5th day of September 1967.

(SEAL)
Attest:

ERNEST W. SWIDER
Attesting Officer

EDWARD J. BRENNER
Commissioner of Patents